United States Patent
Persson et al.

(10) Patent No.: US 8,638,753 B2
(45) Date of Patent: Jan. 28, 2014

(54) QCI MAPPING AT ROAMING AND HANDOVER

(75) Inventors: Fredrik Persson, Märsta (SE); Paul Stjernholm, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 555 days.

(21) Appl. No.: 12/988,312

(22) PCT Filed: Apr. 21, 2008

(86) PCT No.: PCT/SE2008/050448
§ 371 (c)(1),
(2), (4) Date: Oct. 16, 2010

(87) PCT Pub. No.: WO2009/131498
PCT Pub. Date: Oct. 29, 2009

(65) Prior Publication Data
US 2011/0044198 A1 Feb. 24, 2011

(51) Int. Cl.
*H04W 36/00* (2009.01)
(52) U.S. Cl.
USPC ............................................... 370/331
(58) Field of Classification Search
USPC .......... 370/252, 331–334, 315, 235; 709/220, 709/223, 227–229; 455/436–437
See application file for complete search history.

(56) References Cited

U.S. PATENT DOCUMENTS

| | | | |
|---|---|---|---|
| 2008/0130637 A1* | 6/2008 | Kant et al. | 370/389 |
| 2009/0129342 A1* | 5/2009 | Hwang et al. | 370/331 |
| 2009/0201884 A1* | 8/2009 | Chaponniere | 370/332 |
| 2009/0207812 A1* | 8/2009 | Gupta et al. | 370/332 |
| 2010/0240385 A1* | 9/2010 | Lohr et al. | 455/452.2 |
| 2010/0284278 A1* | 11/2010 | Alanara | 370/235 |

FOREIGN PATENT DOCUMENTS

| | | |
|---|---|---|
| CN | 1984123 A | 6/2007 |
| WO | 03/010925 A2 | 2/2003 |

OTHER PUBLICATIONS

PCT Search Report, mailed Feb. 5, 2009, in connection with International Application No. PCT/SE2008/050448.
3GPP TSG SA WG2 Architecture, S2H060350, Apr. 3-6, 2006, Paris, France, Ericsson: "Principles for the SAE QoS Concept".

(Continued)

*Primary Examiner* — Chandrahas Patel
*Assistant Examiner* — Lan Truong
(74) *Attorney, Agent, or Firm* — Potomac Patent Group PLLC (57) ABSTRACT

The technology pertains to wireless telecommunications systems in which a quality of service is handled for a service provided to a user equipment when the user equipment transitions from being served by a source network to being served by a target network. The quality of service is handled even if the source and the target networks implement proprietary QCIs. In general, a source QCI, which may be proprietary to the source network, is remapped to a predetermined QCI that identifies a set of predetermined QCI characteristics whose values are similar to the source QCI characteristics identified by the source QCI. The predetermined QCI and the set of predetermined QCI characteristics are used by the target network to provide the service to the user equipment after the transition.

23 Claims, 10 Drawing Sheets

(56) References Cited

OTHER PUBLICATIONS

3GPP TS 23.401, V8.1.0, Mar. 2008, General Packet Radio Service (GPRS) enhancements for Evolved Universal Terrestrial Radio Access Network (E-UTRAN) access (Release 8).

3GPP 8A2 #64, Jeju Island, Korea, Apr. 7-11, 2008, S2-082648, "Recommended transport network layer DSCP markings in line with IETF DiffServ Service Classes" Nortel, Cisco.

3GPP TSG SA WG2 Meeting #63, TDS2-081493, Athens, Greece, Feb. 18-22, 2008, Nokia, Nokia Siemens Networks: "QoS Profile Mapping during mobility from E-UTRAN to UTRAN/GERAN".

Ludwig et al. "An Evolved 3GPP QoS Concept" Vehicular Technology Conference, 2006, VTC 2006, Spring, IEEE 63rd, May 1-10, 2006, vol. 1, pp. 388-392, ISSN: 1550-2252, ISBN: 1-7803-9392-9.

3GPP TSG SA WG2 Architecture, S2#59, S2-073247, Aug. 27-31, 2007, Helsinki, Finland, Huawei: "Discusssion on the QoS Mapping Mechanism during Inter-Rat Handover".

3GPP TS 36.300, V8.3.0, Dec. 2007, Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Chinese Office Action, dated Oct. 25, 2012, in connection with counterpart Chinese Patent Application No. 200880128664.9 (see Translation below).

Translation of Chinese Office Action, dated Oct. 25, 2012, in connection with counterpart Chinese Patent Application No. 200880128664.9.

* cited by examiner

QCI MAPPING AT ROAMING AND HANDOVER

TECHNICAL FIELD

The technology pertains to wireless telecommunications systems, and in particular to methods and arrangements for handling a quality of service for a service provided to a user equipment when the user equipment transitions from being served by one network (source network) to being served by another network (target network) such as during roaming or handover.

BACKGROUND

In general, wireless networks define a Quality of Service (QoS) concept to handle a quality of the service provided to a user equipment (UE). A "service" may be viewed as offering an operator of a network makes to a subscriber. Examples of services include voice over Internet Protocol (VoIP), real-time gaming, conversational video (live streaming), non-conversational video (buffered streaming), and so on. The traffic running in the wireless network can be divided into separate service data flows (SDF).

The traffic handling attributes for each SDF may be determined by a set of QoS parameters. Examples of QoS parameters are UE power settings, default uplink maximum bit rates, default downlink maximum bit rates, and so on. These can be dynamically signaled when the SDF is established.

Figure 1:
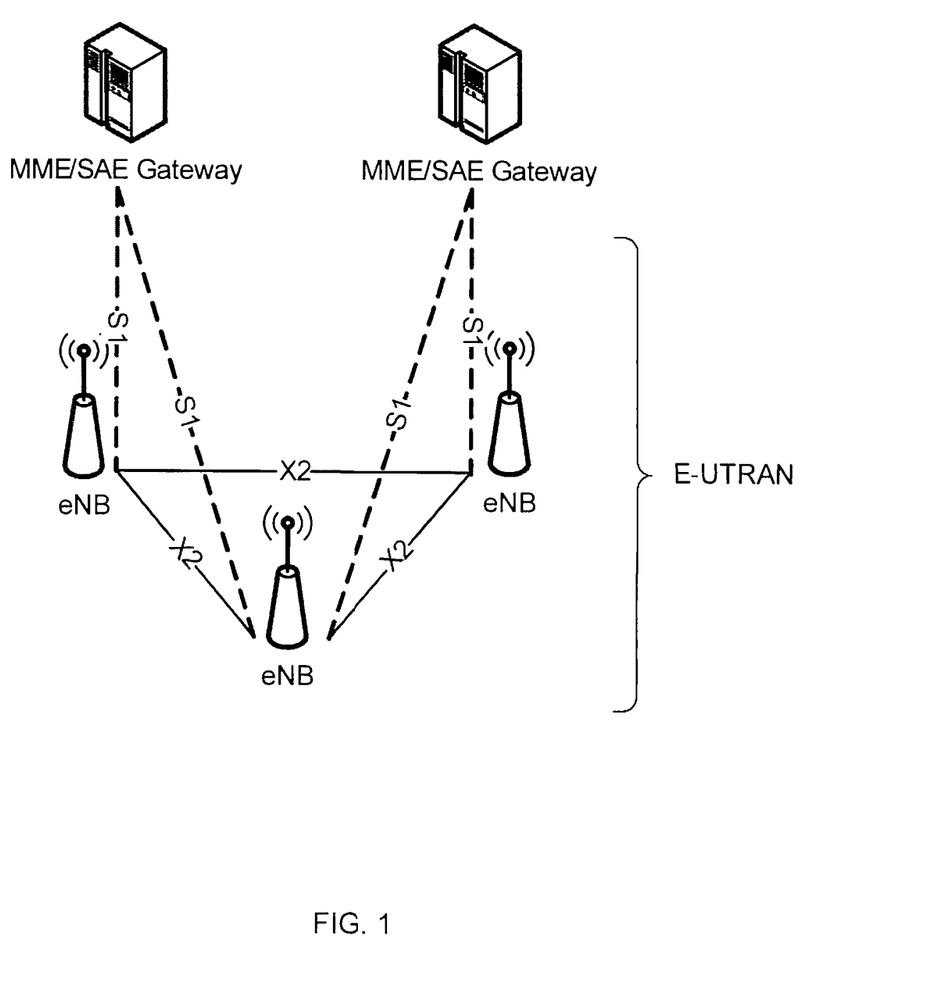
FIG. 1 illustrates an architecture of a wireless network in 3GPP.

In the $3^{rd}$ Generation Partnership Project (3GPP), a specification is on going for the Evolved Universal Terrestrial Radio Access Network (E-UTRAN), which is an example of a next generation of radio access network. Another name used for E-UTRAN is Long Term Evolution (LTE) Radio Access Network. A base station in this context is called E-UTRAN NodeB (eNB). FIG. 1 illustrates one such network architecture.

In 3GPP standardized networks as well as in other types of wireless networks, a service bearer is used to provide the actual service to the UE. A service bearer may be viewed as an edge-to-edge association between a UE and a gateway of the network providing the service to the UE. For example, in 3GPP, to provide E-UTRAN access to an evolved packet core (EPC), a packet data network (PDN) connectivity service is provided by an evolved packet system (EPS) bearer.

An association between a service bearer and QoS parameters define the characteristics of the service and the treatment with regard to, among others, policies for packet forwarding and scheduling. An example specifically related to LTE and 3GPP Release 8 is described as follows.

A service bearer (such as the EPS bearer), which is used by a network to provide the service to the UE, can be defined through a network to which the bearer connects the UE. In addition, the bearer can be defined through a QoS Class Identifier (QCI) via which it can be associated with a set of QoS parameters.

The SDF between the UE and the network can be bound by the set of QoS parameters associated with the service bearer. The service bearer is associated with an uplink traffic flow template (UL TFT) in the UE and with a downlink traffic flow template (DL TFT) in the network. 3GPP Release 8 (3GPP TS 36.300 V8.3.0, incorporated by reference in its entirety) defines an evolved Quality of Service (QoS) concept to allow a radio access network (RAN) to handle the quality of the provided services.

The QCI, in this context, is implemented as a scalar value used to reference access node-specific parameters that control the bearer level packet forwarding treatment including scheduling weights, admission thresholds, queue management thresholds, link layer protocol configuration. Note that the packet forwarding treatment can be configured by the operator owning the access node (e.g. eNB). The QCI can be viewed as a pointer.

Each SDF is associated with a single QCI. That is, each service bearer is associated with a particular QCI. Note that multiple service bearers can share the same PDN connection, i.e., can share a same IP-CAN session.

When setting up a session, that is, when setting up a service connection between the network and the UE, each SDF is mapped to a QCI. Each QCI, which represents a service or a service aggregate, is associated with one set of QCI characteristics. The QCI Characteristics are used to characterize the configurations of the access nodes such as the eNB. In 3GPP, nine different standardized QCI Characteristics are being defined. There will also be standardized one-to-one mappings between the standardized QCI characteristics in the 3GPP Release 8 and certain pre-Release 8 QoS attributes. A standardized one-to-one mapping between the 3GPP Release 8 QCIs and 3GPP pre-Rel8 QoS attributes is defined for handover or roaming between a network implementing the 3GPP Release 8 and another network implementing a pre-Release 8 QoS framework. With standardized QCI configurations, interoperability between operators is possible.

In addition to the standardized QCI characteristics of the 3GPP Release 8, an operator of a network is free to define QCI characteristics particular to the network in 3GPP. In other words, the operator has the freedom to implement proprietary QCI characteristics whose definitions are only known by and are really meaningful only to the network itself. Furthermore, the operator is not mandated to implement any of the standardized QCI characteristics relevant to the 3GPP Release 8. It is thus possible that operators of different networks will implement different sets of QCI characteristics. Between two networks, the least common denominator known by both parties is the common standardized QCI characteristics implemented by both operators.

When a service transition occurs, such as when a handover or roaming is performed, between two networks where at least one network implements the 3GPP Release 8, the main service identifier is the QCI. One way to allow interoperability between the different networks is the definition of the standardized QCI characteristics.

However, interoperability is not ensured for the service in the situation described. First, even assuming the QCI identifies one of the standardized characteristics, if the other network does not implement the 3GPP Release 8, interoperability will not occur. Second, again assuming that the QCI identifies one of the standardized characteristics, if the other network does not implement the standardized characteristics particular to the QCI (since the network is not mandated to implement all standardized characteristics), interoperability will not occur. Third, if the QCI is proprietary to the network, then interoperability will not occur.

SUMMARY

In one or more non-limiting embodiments, a service for a user equipment may transition from being provided by a source network to being provided by a target network. To enable interoperability when the transition occurs, a source QCI associated with the service provided by the source network is remapped to a predetermined QCI whose identified predetermined QCI characteristics are similar to the source QCI characteristics identified by the source QCI. The source QCI and the source QCI characteristics can be proprietary to the source network. That is, the source QCI and the source QCI characteristics are applicable to the source network but not applicable to the target network. However, the predetermined QCI and the predetermined QCI characteristics are applicable, i.e., understood by and are meaningful to, both the source and the target networks.

A source service bearer is used by the source network to provide the service to the user equipment prior to the transition. A set of source QoS parameters is associated with the source service bearer. The set of source QoS parameters may be proprietary to the source network. When the transition occurs, a target service bearer is used by the target network to provide the service to the user equipment. A set of target QoS parameters is associated with the target service bearer.

To enable interoperability when the transition occurs, the source network, and in particular a mobility controller of the source network, aligns the set of source QoS parameters with a predetermined QCI. The predetermined QCI is one of one or more preconfigured QCIs where each preconfigured QCI correspondingly identifies a set of preconfigured QCI characteristics. Based on the predetermined QCI, the mobility controller assigns the set of target QoS parameters for the target network.

The set of source QoS parameters corresponds to a source QCI which identifies a set of source QCI characteristics. If the source network implements a standard such as the 3GPP Release 8, then the mobility controller chooses as the predetermined QCI the preconfigured QCI whose set of preconfigured QCI characteristics minimizes differences with the set of source QCI characteristics.

Each preconfigured QCI also corresponds to a set of preconfigured QoS parameters. In this situation, the mobility controller can choose as the predetermined QCI the preconfigured QCI whose set of preconfigured QoS parameters minimizes differences with the set of source QoS parameters.

If the target network implements a standard such as the 3GPP Release 8, the source network assigns the set of predetermined QoS parameters as the set of target QoS parameters. If the target network does not implement the standard or such implementation is not necessarily relied upon, then the source network remaps the set of predetermined QoS parameters to a set of QoS parameters local to the target network and assigns the remapped parameters as the set of target QoS parameters. For example, the source network can remap such that differences between the set of predetermined QoS parameters and the set of QoS parameters local to the target network are minimized.

The set of target QoS parameters assigned by the source network is used by the target network to provide the service to the user equipment when the transition occurs. Alternatively, the set of target QoS parameters is remapped again at the target network, e.g., by the mobility controller of the target network, to a remap set of target QoS parameters. When this occurs, the target service bearer is based on the remap set of target QoS parameters. The remap set of target QoS parameters can be proprietary to the target network.

If the target network implements a standard such as the 3GPP Release 8, the target network remaps the set of target QoS parameters by remapping the predetermined QCI to a remap target QCI, retrieves a set of QoS parameters corresponding to the remap target QCI and assigns the retrieved set of QoS parameters as the remap set of target QoS parameters according to defined policies. To remap the predetermined QCI, the target network can, e.g., retrieve the remap target QCI from a preloaded QCI mapping table in which mapping information between preconfigured QCIs and remap target QCIs is maintained.

If the target network does not implement the standard or the implementation is not necessarily relied upon, the target network can remap the set of target QoS parameters according to defined policies e.g. by retrieving the remap target QoS parameters from a preloaded QCI mapping table in which mapping information between sets of target QoS parameters and sets of remap target QoS parameters is maintained.

There may exist a proxy, in either the source or the target network, that maps a source QCI to a target QCI. Here, it can be assumed that the set of source QoS parameters corresponds with the source QCI which identifies a set of source QCI characteristics and that the set of target QoS parameters corresponds with the target QCI which identifies a set of target QCI characteristics. When the proxy exists, the source QCI is mapped to the target QCI to accomplish the transition. The source QCI (and the set of source QCI characteristics) can be proprietary to the source network.

Similarly, the target QCI (and the set of target QCI characteristics) can be proprietary to the target network.

One or both of the source and the target networks implement a standard such as the 3GPP Release 8.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

As noted above in the background, interoperability is not ensured for a service provided to a user equipment when transitioning from being served by a source network to being served by a target network in a conventional manner. Interoperability is not ensured even if one or both the source and the target network implement one or more standardized QCI characteristics such as the 3GPP Release 8. This is because each network is free to implement proprietary QCI characteristics meaningful only to itself and also because the network is not mandated to implement all standardized QCI characteristics.

In 3GPP Release 8, the parameters governing the QoS include QoS class identifier (QCI), guaranteed bit rate (GBR), maximum bit rate (MBR), aggregate maximum bit rate (AMBR) and allocation retention policy (ARP). ARP is primarily used to determine whether a service bearer for the service can be established (i.e., decide whether the service to the UE can be provided) when there are resource limitations (such as too many UEs vying for connections) from the network. GBR and MBR denote the bit rate and the maximum bit rate that can be expected to be provided by a GBR bearer. AMBR limits the aggregate bit rate that can be expected to be provided by all Non-GBR service bearers of a UE sharing a same PDN connection.

The standardized QCI characteristics in 3GPP Release 8 include the QCI (1 thru 9), Resource Type (GBR or non-GBR), Priority, Packet Delay Budget (PDB) and Packet Loss Rate (PLR). The Resource Type determines if dedicated network resources related to a service or bearer level GBR value are permanently allocated or not. Every QCI (both GBR and non-GBR) is associated with a priority level, e.g., for scheduling purposes, in which level 1 is the highest. PDB denotes the time that a packet may be delayed between the UE and the PDN gateway. PLR defines an upper bound for a rate of non-congestion related packet losses. The purpose of the PLR is to allow for appropriate link layer protocol configurations (e.g. RLC and HARQ in E-UTRAN).

In one or more non-limiting embodiments, interoperability is ensured between the source and the target network. In general, a source QCI, which may be proprietary to the source network, is remapped to a predetermined QCI that identifies a set of predetermined QCI characteristics whose values are similar to the source QCI characteristics identified by the source QCI.

The term "proprietary" is used only in the context between two networks such as a source network and a target network. When the source QCI is described as being proprietary to the source network, it simply conveys that the source QCI is meaningful to the source network and not meaningful to the target network. While a particular QCI may be meaningful only to one network, the term itself is not necessarily intended to convey such universal uniqueness unless otherwise explicitly stated. In the context between source and target networks, the source QCI can be described as being applicable to source network and not applicable to the target network.

In contrast to the source QCI and the corresponding set of source QCI characteristics, the predetermined QCI and the corresponding set of predetermined QCI characteristics are not particular to either the source or the target network. The predetermined QCI and the set of predetermined QCI characteristics are applicable—meaningful—to both the source and the target networks. The predetermined QCI and the set of predetermined characteristics can conform to a standard (such as the 3GPP Release 8).

Figure 2:
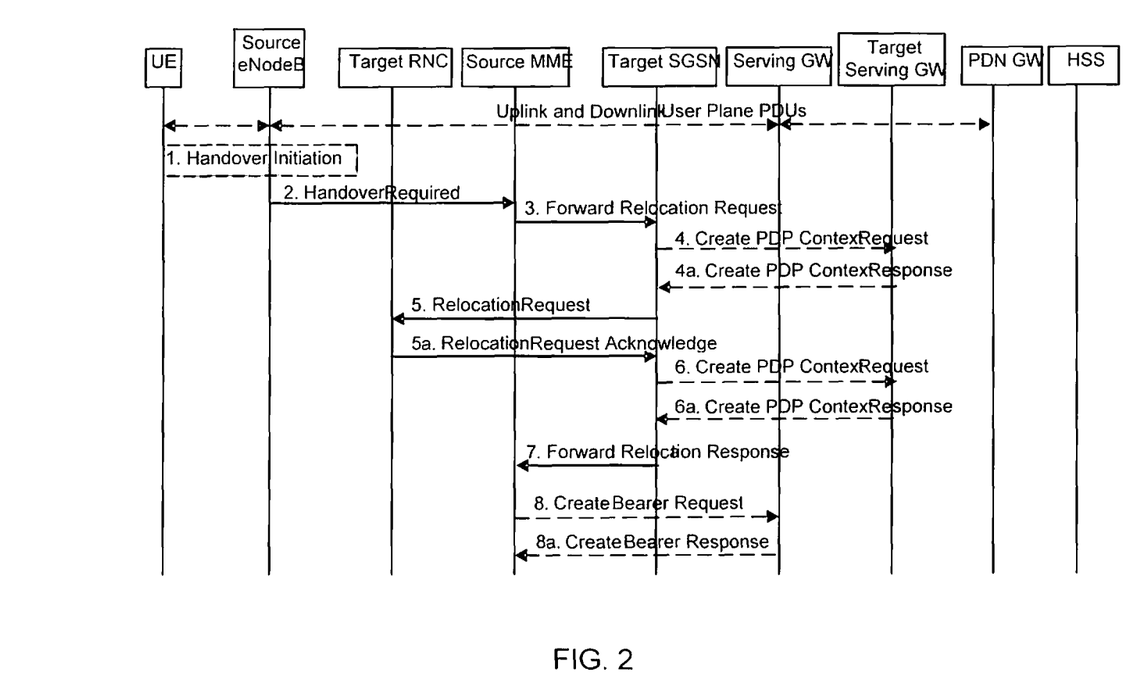
FIG. 2 illustrates an example transition (handover) from a source network to a target network.

An example transition of a service to from a source network to a target network is illustrated in FIG. 2. In FIG. 2, an Inter Radio Access Technology (IRAT) handover is illustrated. During an IRAT handover between different 3GPP RATs, the QoS mapping is performed in the a mobility management entity (MME). Note that both intra- and inter-RAT handover can be either intra- or inter-operator—the embodiment is not limited to any specific case. Preferably, one or both of the source and the target network implements a standardized QoS mapping framework such as the 3GPP Release 8.

Note that the embodiments are not limited to 3GPP. The MME is merely an example of a mobility controller applicable to the LTE network. Other examples of the mobility controller include the SGSN of WCDMA and GSM networks.

Figure 3:
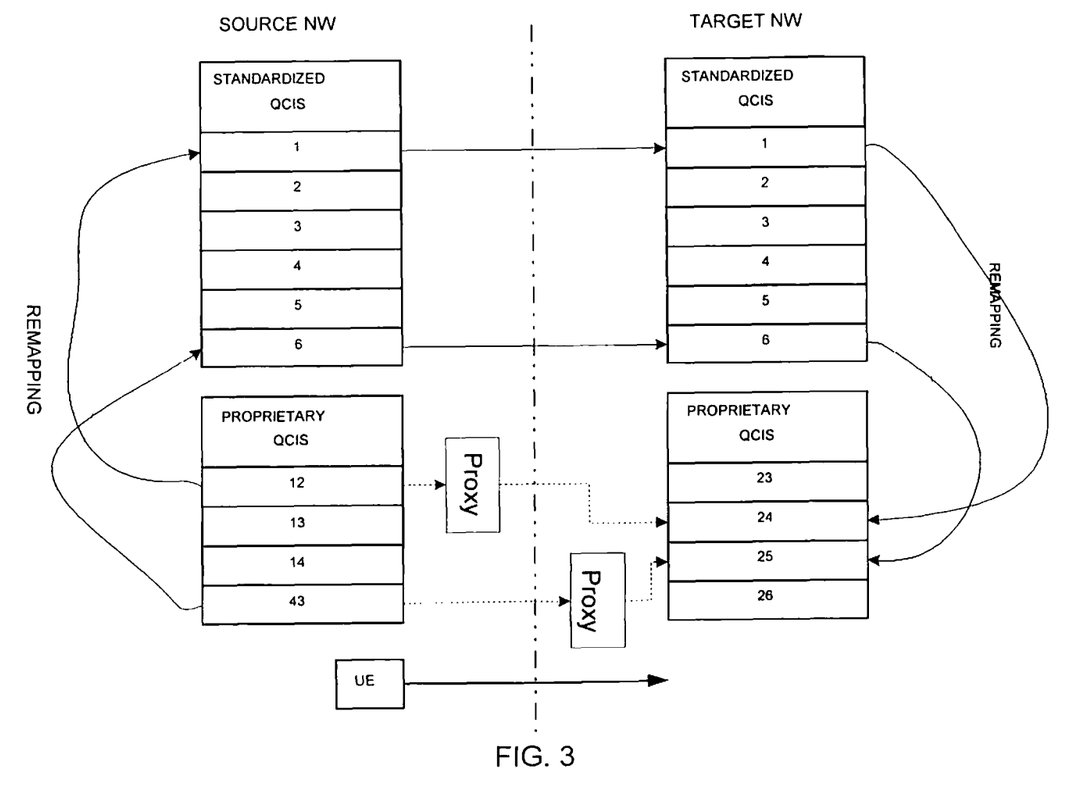
FIG. 3 illustrates an example QCI mapping at transition with and without proxy.

One way of ensuring interoperability is explained with reference to FIG. 3, which illustrates an example QCI mapping of service transition between the source and target networks. In FIG. 3, it is assumed that a source service bearer used by the source network is associated with a set of source QoS parameters, and it is also assumed that the set of source QoS parameters are associated with a set of source QCI characteristics identifiable by a source QCI which are proprietary to the source network. That is, the source QCI, the set of source QCI characteristics and the set of source QoS parameters are meaningful/applicable to the source network, but not meaningful/applicable to the target network.

At the source network, the proprietary QCI associated with the service bearer is mapped to a predetermined QCI whose set of predetermined QCI characteristics are similar to the set of source QCI characteristics identified by the proprietary QCI. The predetermined QCI and the corresponding set of predetermined QCI characteristics can conform to a standard such as the 3GPP Release 8, but this is not a strict requirement.

At the target network, the predetermined QCI along with corresponding set of predetermined QCI characteristics are used to determine a target service bearer to provide the service when the user equipment transitions to the target network. It is assumed that the target service bearer is associated with a set of target QoS parameters, and it is also assumed that the set of target QoS parameters are associated with a set of target QCI characteristics which are identifiable by the target QCI.

Alternatively, the set of target QoS parameters, which can be assigned by the source network, can again be remapped to a remap set of target QoS parameters at the target network. Generally when the remapping occurs, the remap set of target QoS parameters are proprietary to the target network. That is, the remap target QCI, the remap set of target QCI characteristics and the remap set of source QoS parameters are meaningful to the target network, but not meaningful to the source network.

Note that the remapping at the source and at the target networks can be avoided if there is a proxy that understands a mapping of proprietary QCIs between the two networks as shown.

Figure 4:
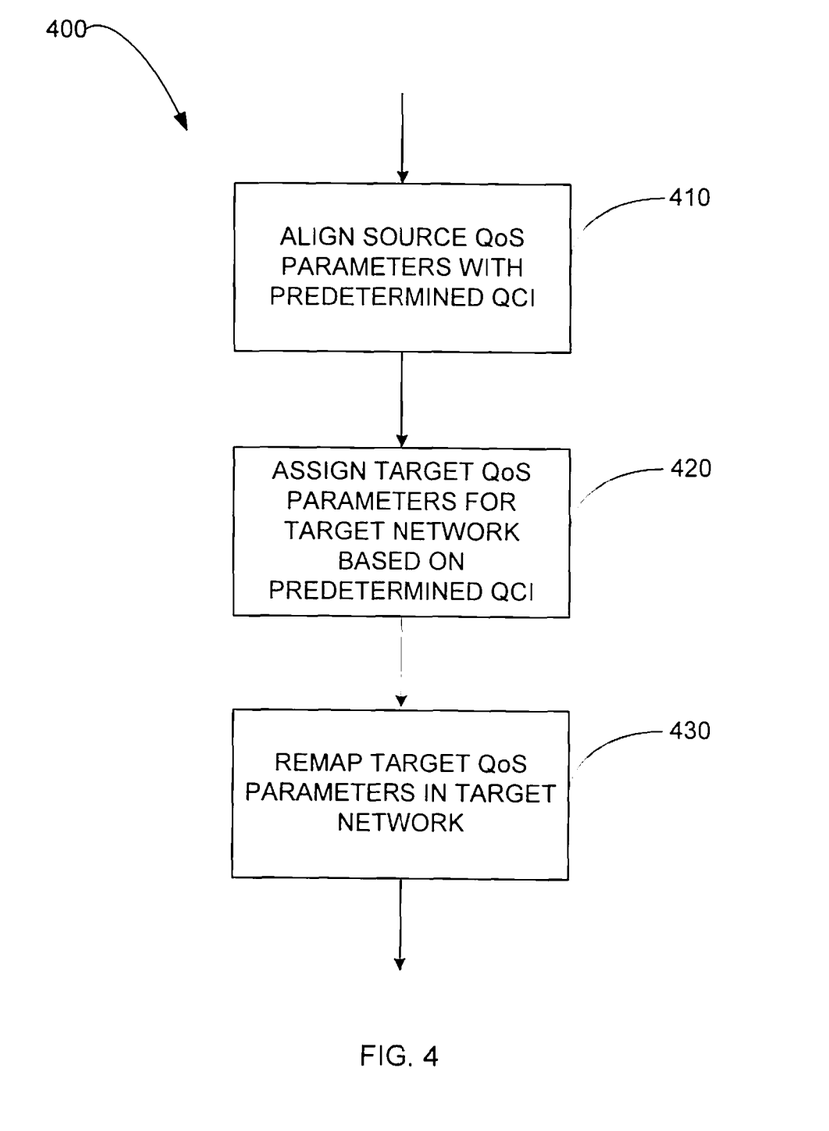
FIG. 4 illustrates an example method to perform QCI mapping.

FIG. 4 illustrates an example method 400 for QCI mapping when a transition occurs of a service to a user equipment from being provided by a source network to being provided by a target network. It is preferred that the source network and/or the target network implements standardized QCI characteristics such as the characteristics of the 3GPP Release 8.

In method 400, a set of source QoS parameters is aligned with a predetermined QCI in act 410. The alignment can be performed at the source network, e.g., by a mobility controller of the source network. The set of source QoS parameters (e.g., QCI, GBR, MBR, AMBR and ARP) is associated with a source service bearer, which is for use by the source network to provide the service to the UE prior to the transition. Also, the set of source QoS parameters can be proprietary to the source network.

The predetermined QCI is one of one or more preconfigured QCIs where each preconfigured QCI correspondingly identifies a set of preconfigured QCI characteristics (e.g., QCI, Resource Type, Priority, PDB and PLR). Any of the preconfigured QCI and the corresponding set of preconfigured QCI characteristics (including the predetermined QCI and the predetermined QCI characteristics) can conform to a standard such as the 3GPP Release 8. At a minimum, it is preferred that the predetermined QCI and the predetermined QCI characteristics are applicable to both the source and the target networks.

Figure 5A:
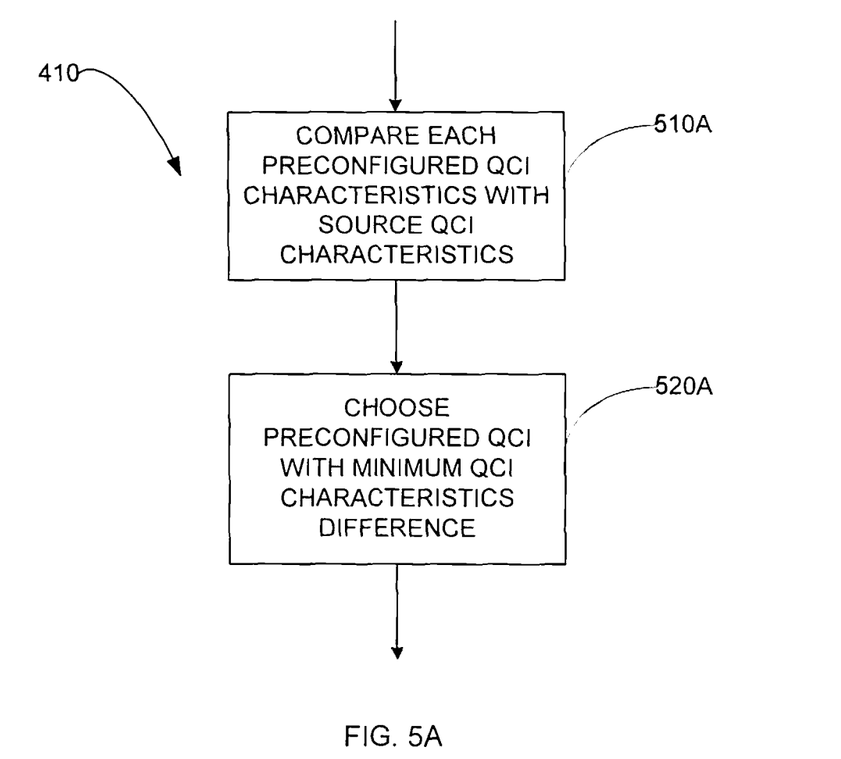
FIGS. 5A and 5B illustrate example methods to align a set of source QoS parameters to a predetermined QCI.

FIG. 5A illustrates an example method to perform act 410 of aligning the set of source QoS parameters with the predetermined QCI. Here, it is assumed that the source network implements the one or more QCI characteristics of a standard, i.e., the 3GPP Release 8. Also, the set of source QoS parameters correspond to a source QCI which in turn identifies a set of source QCI characteristics.

In FIG. 5A, each set of the preconfigured QCI characteristics is compared with the set of source QCI characteristics in act 510A. In act 520A, the preconfigured QCI whose set of preconfigured QCI characteristics is closest to, i.e., has a minimum difference with, the set of source QCI characteristics is chosen as the predetermined QCI.

Figure 5B:
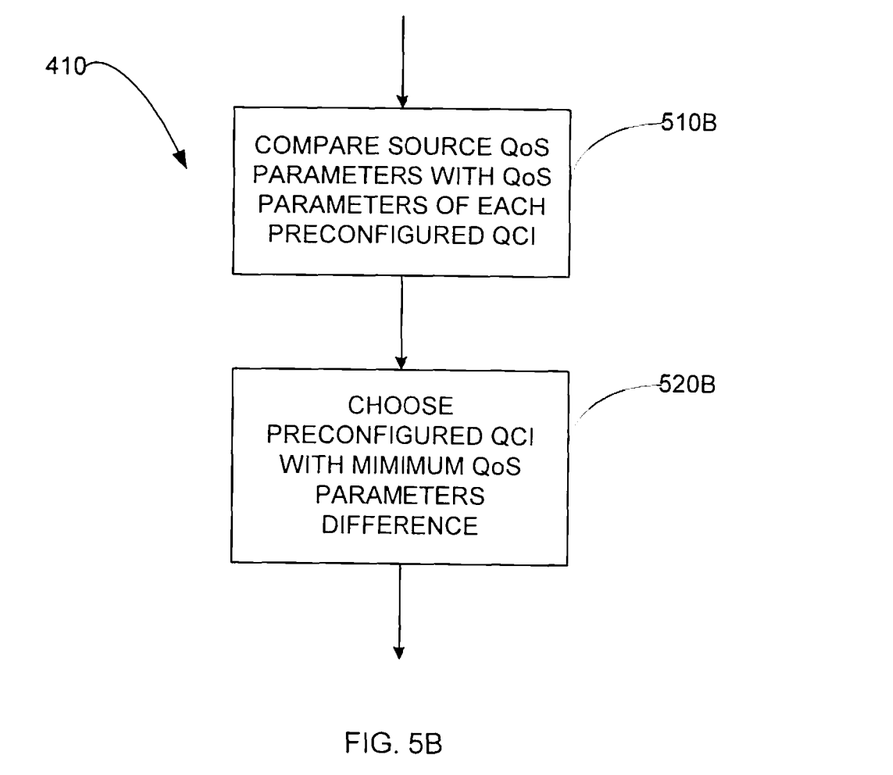

FIG. 5B illustrates another example method to perform act 410 of aligning the set of source QoS parameters with the predetermined QCI. Here, it is not necessary that the source network implements the standard such as the 3GPP Release 8. This is not meant to convey that the source network cannot implement the standard. It simply illustrates that in the described embodiments, implementation of the standard need not be strictly relied upon. It is assumed that each preconfigured QCI corresponds to a set of preconfigured QoS parameters. In FIG. 5B, each set of the preconfigured QoS parameters is compared with the set of source QCI parameters in act 510B. In act 520B, the preconfigured QCI whose set of preconfigured QoS parameters is closest to the set of source QoS parameters is chosen as the predetermined QCI.

Referring back to FIG. 4, after aligning the set of source QoS parameters with the predetermined QCI in act 410, a set of target QoS parameters for the target network is assigned based on the predetermined QCI in act 420. The set of target QoS parameters is associated with a target service bearer for use by the target network to provide the service to the UE when the transition occurs. The set of target QoS parameters can be assigned at the source network. The set of target QoS parameters assigned in act 420 are applicable, i.e., meaningful, to both the source and the target networks. If the target network implements a standard such as the 3GPP Release 8, then act 420 may be accomplished by simply assigning a set of predetermined QoS parameters that corresponds to the predetermined QCI as the set of target QoS parameters.

Figure 6:
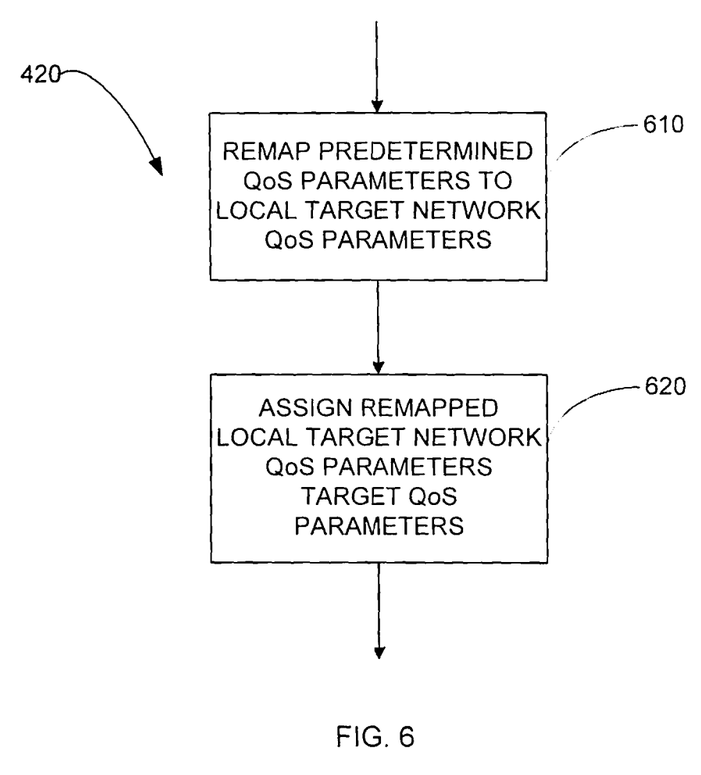
FIG. 6 illustrates an example method to assign a set of target QoS parameters.

If the target network does not implement the standard or such implementation is not relied upon, then act 420 of assigning the set of target QoS parameters can be accomplished by a method as illustrated in FIG. 6. Here, it is assumed that the predetermined QCI corresponds to a set of predetermined QoS parameters. In the method, the set of predetermined QoS parameters is remapped to a local set of target QoS parameters in act 610, e.g., at the source network. The local set of target QoS parameters are applicable to the target network. To accomplish this, the source network is preferred to have knowledge of the QoS parameters applicable to the target network. The local set of target QoS parameters are then assigned as the set of target QoS parameters in act 620.

Referring back to FIG. 4, the set of target QoS parameters, assigned at the source network in act 420, can be used by the target network to provide the service to the user equipment when the service transition occurs. This is possible since the target service bearer used by the target network can be associated with the set of target QoS parameters assigned in act 420.

Alternatively, the set of target QoS parameters can be remapped again, this time at the target network (by a mobility controller of the target network as an example), to a remap set of target QoS parameters in act 430. Remapping at the target network can be done to achieve, as an example, a differentiation between visiting users and own users when the transition occurs. When the remapping is performed, the target service bearer used by the target network in providing the service to the user equipment when the transition occurs is based on the remap set of target QoS parameters. The remap set of target QoS parameters can be proprietary to the target network.

Remapping can be performed for a variety of reasons. For example, the remapping can provide a different QoS in a particular aspect. As another example, the remapping can provide ways for separate performance monitoring of these bearers.

Figure 7:
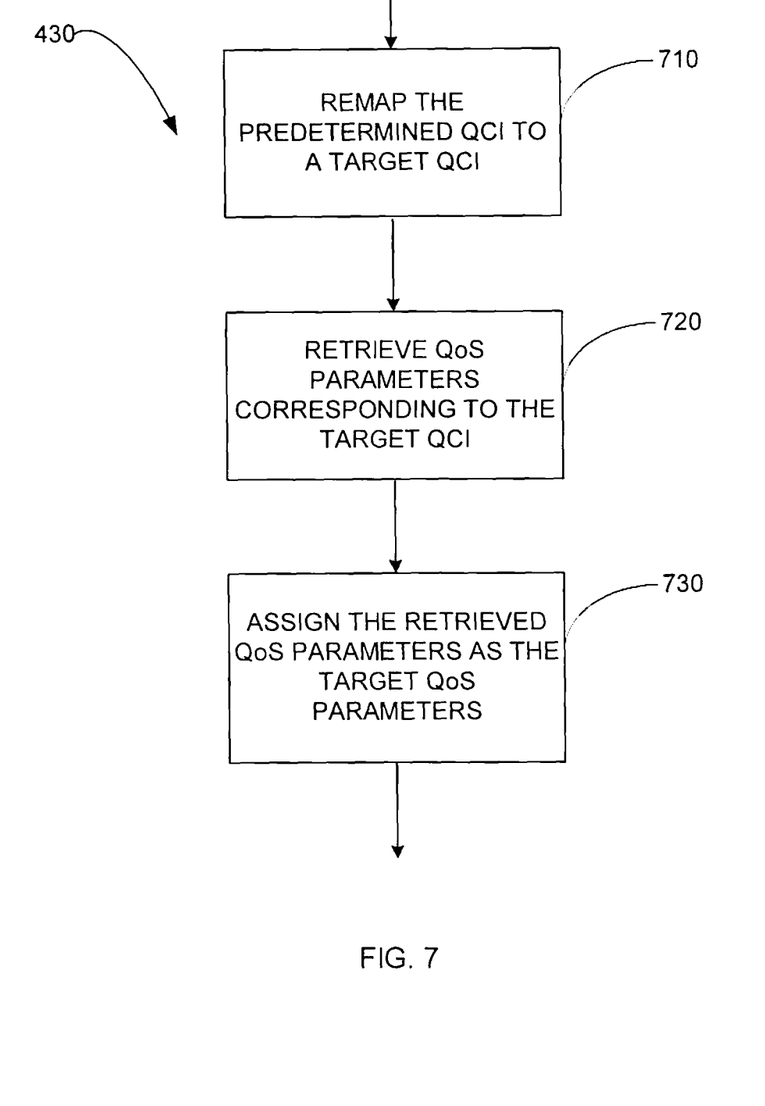
FIG. 7 illustrates an example method to remap a set of target QoS parameters.

If the target network implements a standard (the 3GPP Release 8 QoS), then a method to perform act 430 of remapping the set of target QoS parameters is illustrated in FIG. 7. In act 710, the predetermined QCI is remapped to a remap target QCI. In one embodiment, the remap target QCI can be retrieved from a preloaded QCI mapping table in which mapping information between preconfigured QCIs and remap target QCIs is maintained. In another embodiment, the remapping can be implemented to enforce rules and policies of the target network. For example, the target network may have a policy of providing a higher level of service for home users then for visiting users. In this instance, for the same predetermined QCI, the resulting remap target QCI can differ for different UEs. In act 720, a set of QoS parameters identified by the remap target QCI is retrieved. The retrieved set of QoS parameters is assigned as the remap set of target QoS parameters in act 730.

If it is not necessary for the target network to implement the standard, then act 430 of remapping the set of target QoS parameters can be accomplished by retrieving the remap target QoS parameters from a preloaded QCI mapping table in which mapping information between sets of target QoS parameters and sets of remap target QoS parameters is maintained or to enforce rules and policies of the target network.

Referring back to FIG. 3, when a proxy which able to provide mapping information from the source QoS parameters to the target QoS parameters is available, then the steps of mapping the source QoS parameters to the predetermined QCI at the source and remapping the predetermined QCI at the target network can be avoided. The proxy may exist at the source network and/or at the target network. The proxy can be used to realize policies of the network(s) as parts of a service level agreement (SLA) between the networks. The proxy allows to define explicit mappings between the QoS in the source network and the QoS in the target network, whereas remapping to a predetermined QoS at the source may lose some of the context which affects the resolution in the subsequent QoS mapping. The proxy is especially useful in situations in which the source objects (QCI, QCI characteristics, QoS parameters) are proprietary to the source network and the target objects (QCI, QCI characteristics, QoS parameters) are proprietary to the target network.

Figure 8:
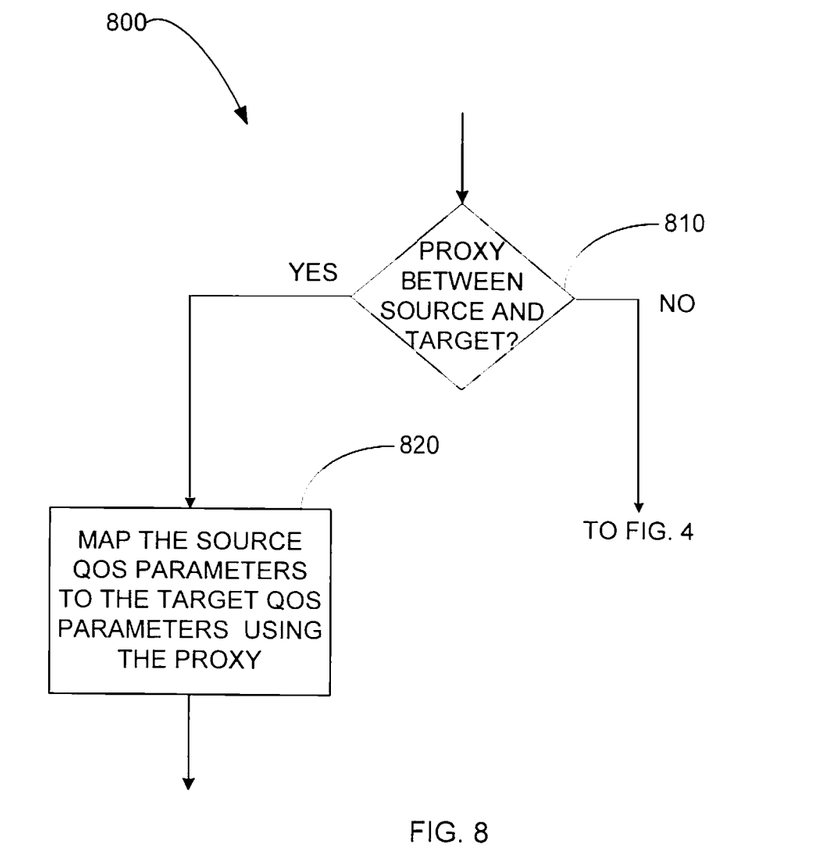
FIG. 8 illustrates an example method to map a source QCI to a target QCI using a proxy.

FIG. 8 illustrates an example method 800 to map the set of source QoS parameters to the set of target QoS parameters using a proxy. In this method, a determination is made on whether a proxy exists that has the requisite mapping information. Here, it can be assumed that the set of source QoS parameters corresponds with a source QCI that identifies a set of source QCI characteristics and/or the set of target QoS parameters corresponds with a target QCI that identifies a set of target QCI characteristics. If the proxy does not exist or the proxy does not have the requisite information, then the method proceeds with acts as illustrated in FIG. 4.

If the proxy does have the requisite mapping information, then the set of source QoS parameters is mapped to the set of target QoS parameters using the proxy in act 820. In one embodiment, the proxy has mapping information between the source QCI the set of target QoS parameters, and the source QCI can be directly mapped to the set of target QoS parameters in act 820. In another embodiment, the proxy has mapping information between the set of source QoS parameters and the target QCI, and the set of source QoS parameters can be directly mapped to the target QCI in act 820. In yet another embodiment, the proxy includes mapping information between the source QCI and the target QCI, and the source QCI can be directly mapped to the target QCI in act 820.

Figure 9:
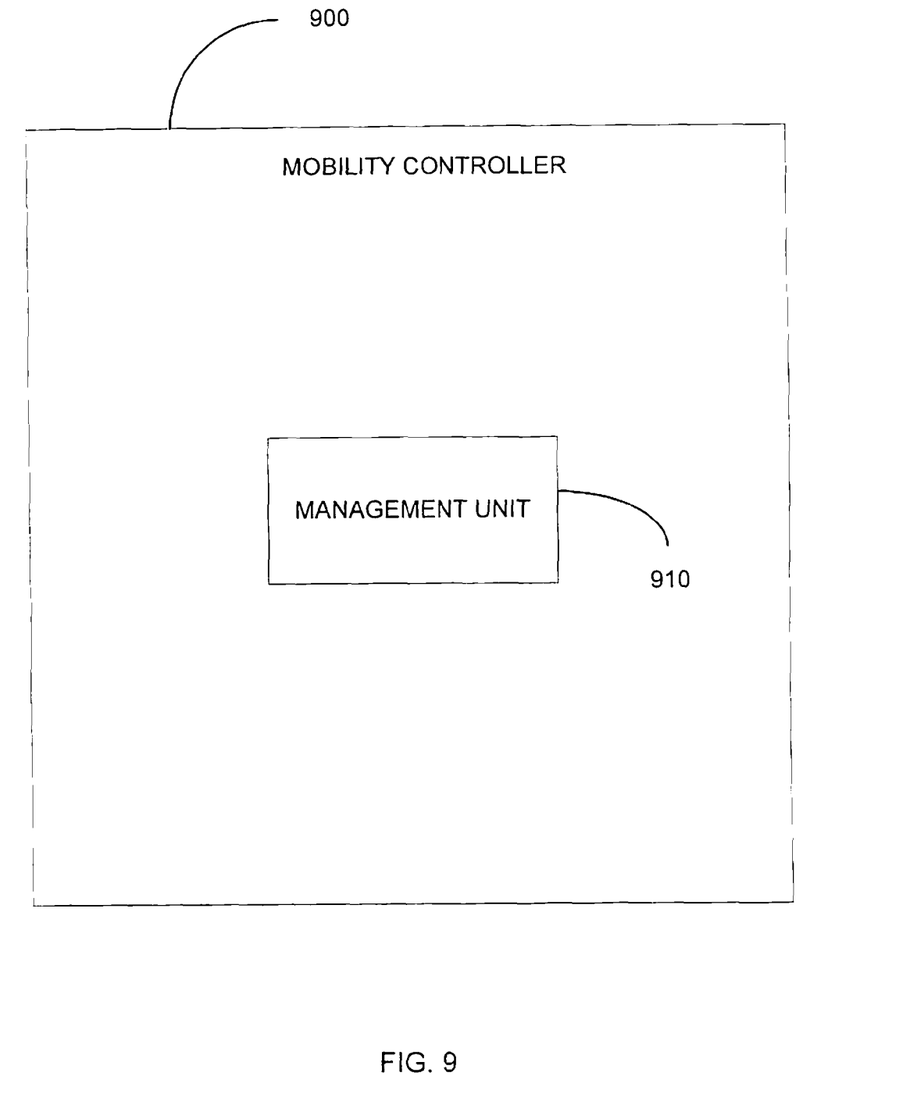
FIG. 9 illustrates an example embodiment of a mobility controller capable of performing QCI mapping.

The methods illustrated in FIGS. 2-8 may be performed by a mobility controller 900 of a network as illustrated in FIG. 9. In particular, the management unit 910 of the mobility controller 900 may perform the acts. The mobility controller 900 can be an MME in an LTE network or an SGSN in a WCDMA or GSM network. These are merely examples and are not meant to be limitations.

Through the non-limiting embodiments and methods described above, basic characteristics of service for a UE will be handled, even though the source and the target network operators use proprietary QCIs, or different 3GPP QoS frameworks are used. Even if not all standardized QCIs are supported by the source/home or target/visiting networks, the proprietary QCI, alternatively the QCI obtained from the standardized mapping from pre-Rel8 QoS to Release 8 QCI (and vice versa) can be mapped and remapped to one of the supported QCIs. A proxy can be incorporated that maintains mappings of proprietary Release 8 QCIs and/or pre-Rel8 QoS. With the technology described above, operators of networks will be able to assign proprietary QCIs to services and still achieve interoperability.

Although various embodiments have been shown and described in detail, the claims are not limited to any particular embodiment or example. None of the above description should be read as implying that any particular element, step, act, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A method of mapping a quality of service class identifier (QCI) between a source network and a target network for a service provided to a user equipment (UE), comprising:
   (a) aligning a set of source quality of service (QoS) parameters with a predetermined QCI; and
   (b) assigning a set of target QoS parameters for a target network based on the predetermined QCI;
   wherein the set of source QoS parameters is associated with a source service bearer for use by the source network to provide the service to the UE prior to a transition of the UE from being served by the source network to being served by the target network, the source network and the target network have different operators, the predetermined QCI is one of at least one preconfigured QCIs that is recognized by the source and target networks, each preconfigured QCI correspondingly identifies a set of preconfigured QCI characteristics, the set of target QoS parameters is associated with a target service bearer for use by the target network to provide the service to the UE when the transition occurs, each preconfigured QCI corresponds to a set of preconfigured QoS parameters; and act (a) comprises:
   (ac) comparing the set of preconfigured QoS parameters of each preconfigured QCI with the set of source QoS parameters; and
   (ad) choosing as the predetermined QCI the preconfigured QCI with the corresponding set of preconfigured QoS parameters that minimizes differences with the set of source QoS parameters.

2. The method of claim 1, wherein acts (a) and (b) are performed at the source network.

3. The method of claim 1, wherein the set of source QoS parameters is applicable to the source network and not applicable to the target network.

4. The method of claim 1, wherein the QoS parameters associated with a service include at least one of a QCI, a guaranteed bit rate (GBR), a maximum bit rate (MBR), an aggregate maximum bit rate (AMBR), and an allocation retention priority (ARP); and the QCI characteristics identified by a QCI include at least one of a resource type, a priority level, a packet delay budget (PDB), and a packet loss rate (PLR).

5. The method of claim 1, wherein the set of source QoS parameters corresponds to a source QCI that identifies a set of source QCI characteristics; and act (a) comprises:
   (aa) comparing the set of preconfigured QCI characteristics of each preconfigured QCI with the set of source QCI characteristics; and
   (ab) choosing as the predetermined QCI the preconfigured QCI with corresponding set of preconfigured QCI characteristics that minimizes differences with the set of source QCI characteristics.

6. The method of claim 1, wherein the predetermined QCI corresponds to a set of predetermined QoS parameters; and act (b) comprises assigning the set of predetermined QoS parameters as the set of target QoS parameters.

7. The method of claim 1, wherein the predetermined QCI corresponds to a set of predetermined QoS parameters; and act (b) comprises:
   (ba) remapping the set of predetermined QoS parameters to a local set of target QoS parameters; and
   (bb) assigning the local set of target QoS parameters as the set of target QoS parameters.

8. The method of claim 1, further comprising:
   (c) remapping the set of target QoS parameters to a remap set of target QoS parameters;
   wherein the target service bearer for use by the target network to provide the service to the UE when the transition occurs is based on the remap set of target QoS parameters.

9. The method of claim 8, wherein the remap set of target QoS parameters is applicable to the target network and not applicable to the source network.

10. The method of claim 8, wherein act (c) is performed at the target network.

11. The method of claim 8, wherein act (c) comprises:
   (ca) remapping the predetermined QCI to a remap target QCI;
   (cb) retrieving a set of QoS parameters corresponding to the remap target QCI; and
   (cc) assigning the set of QoS parameters retrieved in act (cb) as the remap set of target QoS parameters.

12. The method of claim 11, wherein act (ca) comprises retrieving the remap target QCI from a preloaded QCI mapping table in which mapping information between preconfigured QCIs and remap target QCIs is maintained or remapping to enforce a policy of the target network.

13. The method of claim 8, wherein act (c) comprises retrieving the remap target QoS parameters from a preloaded QCI mapping table in which mapping information between sets of target QoS parameters and sets of remap target QoS parameters is maintained or remapping to enforce a policy of the target network.

14. The method of claim 1, further comprising:
   (d) determining, prior to performing act (a), whether a proxy exists that maps the set of source QoS parameters to the set of target QoS parameters; and
   (e) mapping the source QoS parameters to the target QoS parameters using the proxy if it is determined that the proxy exists.

15. The method of claim 14, wherein act (e) comprises directly mapping a source QCI to the set of target QoS parameters when the proxy includes mapping information between the source QCI and the set of target QoS parameters, the set of source QoS parameters corresponding with the source QCI that identifies a set of source QCI characteristics, or directly mapping the set of source QoS parameters to a target QCI when the proxy includes mapping information between the set of source QoS parameters and the target QCI, the set of target QoS parameters corresponding with the target QCI that identifies a set of target QCI characteristics, or directly mapping the source QCI to the target QCI when the proxy includes mapping information between the source QCI and the target QCI, the set of source QoS parameters corresponding with the source QCI that identifies the set of source QCI characteristics and the set of target QoS parameters corresponding with the target QCI that identifies the set of target QCI characteristics.

16. The method of claim 1, wherein one or both of the source network and the target network implements a Third Generation Partnership Project Release 8 QoS framework.

17. A mobility controller of a wireless network, comprising:
   a management unit arranged to manage a transition of a service provided to a user equipment (UE), wherein when the transition of the service is from the wireless network to a target network, the management unit is arranged to align a set of source quality of service (QoS) parameters with a predetermined QoS class identifier (QCI), and to assign a set of target QoS parameters for the target network based on the predetermined QCI;
   wherein the set of source QoS parameters is associated with a source service bearer for use by the wireless network to provide the service to the UE prior to the transition, the wireless network and the target network have different operators, the predetermined QCI is one of one or more preconfigured QCIs that is recognized by the wireless and target networks, each preconfigured QCI correspondingly identifies a set of preconfigured QCI characteristics, the set of target QoS parameters is associated with a target service bearer for use by the target network to provide the service to the UE when the transition occurs, each preconfigured QCI corresponds to a set of preconfigured QoS parameters; and the management unit is arranged to align the set of source QoS parameters with the predetermined QCI by comparing the set of preconfigured QoS parameters of each preconfigured QCI with the set of source QoS parameters and choosing as the predetermined QCI the preconfigured QCI with the corresponding set of preconfigured QoS parameters that minimizes differences with the set of source QoS parameters.

18. The mobility controller of claim 7, wherein the QoS parameters associated with a service include one or more of a QCI, a guaranteed bit rate (GBR), a maximum bit rate (MBR), an aggregate maximum bit rate (AMBR), and an allocation retention priority (ARP); and the QCI characteristics identified by a QCI include one or more of a resource type, a priority level, a packet delay budget (PDB), and a packet loss rate (PLR).

19. The mobility controller of claim 17, wherein the set of source QoS parameters corresponds to a source QCI that identifies a set of source QCI characteristics; and the management unit is arranged to align the set of source QoS parameters with the predetermined QCI by comparing the set of preconfigured QCI characteristics of each preconfigured QCI with the set of source QCI characteristics and choosing as the predetermined QCI the preconfigured QCI with corresponding set of preconfigured QCI characteristics that minimizes differences with the set of source QCI characteristics.

20. The mobility controller of claim 17, wherein the predetermined QCI corresponds to a set of predetermined QoS parameters; and the management unit is arranged to assign the set of target QoS parameters for the target network by assigning the set of predetermined QoS parameters as the set of target QoS parameters, or by remapping the set of predetermined QoS parameters to a local set of target QoS parameters, and assigning the local set of target QoS parameters as the set of target QoS parameters.

21. A mobility controller of a wireless network, comprising:
   a management unit arranged to remap a set of target Quality of Service (QoS) parameters to a remap set of target QoS parameters when a service provided to a user equipment (UE) is transitioning from a source network to the wireless network;
   wherein the set of target QoS parameters is assigned by the source network based on a predetermined QCI, the source network and the wireless network have different operators, the predetermined QCI is one of one or more preconfigured QCIs that is recognized by the source and wireless networks, each preconfigured QCI correspondingly identifies a set of preconfigured QCI characteristics, the remap set of remap target QoS parameters is associated with a target service bearer for use by the wireless network to provide the service to the UE when the transition occurs, the remap set of target QoS parameters is applicable to the wireless network and not applicable to the source network, the predetermined QCI and the corresponding set of QCI characteristics are applicable to both the wireless and the source networks, and each preconfigured QCI corresponds to a set of preconfigured QoS parameters; and the management unit is arranged to align the set of source QoS parameters with the predetermined QCI by comparing the set of preconfigured QoS parameters of each preconfigured QCI with the set of source QoS parameters and choosing as the predetermined QCI the preconfigured QCI with the corresponding set of preconfigured QoS parameters that minimizes differences with the set of source QoS parameters.

22. The mobility controller of claim 21, wherein the management unit is arranged to remap the set of target QoS parameters to the remap set of target QoS parameters by remapping the predetermined QCI to a remap target QCI, retrieving a set of QoS parameters corresponding to the remap target QCI, and assigning the set of QoS parameters retrieved as the remap set of target QoS parameters.

23. The mobility controller of claim 22, wherein the management unit is arranged to remap the predetermined QCI to the remap target QCI by retrieving the remap target QCI from a preloaded QCI mapping table in which mapping information between preconfigured QCIs and remap target QCIs is maintained.

* * * * *